(12) United States Patent
Ohkawa

(10) Patent No.: US 10,843,560 B2
(45) Date of Patent: Nov. 24, 2020

(54) TRANSFER DEVICE

(71) Applicant: Mazda Motor Corporation, Aki-gun, Hiroshima (JP)

(72) Inventor: Yuzo Ohkawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 376 days.

(21) Appl. No.: 15/865,607

(22) Filed: Jan. 9, 2018

(65) Prior Publication Data

US 2018/0215257 A1 Aug. 2, 2018

(30) Foreign Application Priority Data

Feb. 1, 2017 (JP) .................................. 2017-016865

(51) Int. Cl.
| | |
|---|---|
| *B60K 17/34* | (2006.01) |
| *B60K 17/346* | (2006.01) |
| *F16D 3/2237* | (2011.01) |
| *B60K 17/35* | (2006.01) |
| *B60K 17/344* | (2006.01) |
| *F16D 3/2245* | (2011.01) |
| *F16D 23/12* | (2006.01) |

(Continued)

(52) U.S. Cl.
CPC .......... *B60K 17/346* (2013.01); *B60K 17/344* (2013.01); *B60K 17/35* (2013.01); *F16D 3/2237* (2013.01); *B60K 5/02* (2013.01); *B60Y 2410/102* (2013.01); *F16D 3/2245* (2013.01); *F16D 27/115* (2013.01); *F16D 2023/123* (2013.01)

(58) Field of Classification Search
CPC .... B60K 17/346; B60K 17/344; B60K 17/35; B60K 5/02; F16D 3/2237; F16D 3/2245; F16D 27/115; F16D 2023/123; B60Y 2410/102
See application file for complete search history.

(56) References Cited

U.S. PATENT DOCUMENTS 5,599,249 A * 2/1997 Zalewski ............. B60K 17/344
180/247
5,609,540 A * 3/1997 Brissenden ........ B60K 17/3462
180/248

(Continued)

FOREIGN PATENT DOCUMENTS

JP H04228953 A 8/1992

*Primary Examiner* — Zakaria Elahmadi
(74) *Attorney, Agent, or Firm* — Alleman Hall Creasman & Tuttles LLP

(57) ABSTRACT

A transfer device is provided, which includes an input shaft configured to receive a driving force generated by a drive source, an output shaft configured to output a portion of the driving force to part-time drive wheels of a vehicle, a transfer case accommodating the input and output shafts, at least two output bearings rotatably supporting the output shaft, and a constant-velocity (CV) joint connected to the output shaft and provided on a first side of the part-time drive wheels with respect to the output shaft. The output shaft is formed with a recessed opening portion opening toward the first side and receiving at least a part of the CV joint therein. The transfer case has an annular intruding part extending from the first side of the output shaft into the recessed opening portion. A first output bearing is located inside the recessed opening portion.

5 Claims, 5 Drawing Sheets

(51) Int. Cl.
 *F16D 27/115* (2006.01)
 *B60K 5/02* (2006.01)

(56) References Cited

U.S. PATENT DOCUMENTS

| | | | | |
|---|---|---|---|---|
| 5,695,022 A * | 12/1997 | Zalewski | ............. | B60K 17/344 180/197 |
| 2005/0107200 A1* | 5/2005 | Yamazaki | ............ | B60K 17/344 475/84 |
| 2006/0229154 A1* | 10/2006 | Kakinami | ............. | F16D 3/2237 475/222 |
| 2008/0099267 A1* | 5/2008 | Ruehle | ................. | B60K 17/344 180/233 |
| 2008/0236927 A1* | 10/2008 | Kamikawa | ........... | B60K 17/344 180/248 |
| 2010/0147644 A1* | 6/2010 | Grogg | ................. | F16D 25/0638 192/70.18 |
| 2010/0218632 A1* | 9/2010 | Sasaki | ................... | F16D 27/115 74/416 |
| 2011/0127135 A1* | 6/2011 | Grogg | ................... | B60K 17/35 192/48.1 |
| 2016/0238084 A1* | 8/2016 | Miller | ..................... | F16D 3/223 |
| 2017/0028845 A1* | 2/2017 | Ohkawa | .................. | B60K 17/344 |
| 2017/0292570 A1* | 10/2017 | Ketchel | .................. | F16D 3/223 |
| 2018/0080508 A1* | 3/2018 | Nahrwold | .................. | F16D 13/52 |
| 2018/0201128 A1* | 7/2018 | Niimura | ................ | B60K 23/08 |

* cited by examiner

TRANSFER DEVICE

TECHNICAL FIELD

The present disclosure relates to a transfer device.

BACKGROUND OF THE DISCLOSURE

In four-wheel drive vehicles of a front-engine, rear-wheel drive (FR) base, a part of driving force for driving rear wheels (drive wheels) is transmitted (distributed) to front wheels (part-time drive wheels) by a transfer device. The transfer device mounted on the FR vehicle transmits the driving force to a front differential gear provided to a driveshaft of the part-time drive wheels, via a front propeller shaft extending forward from the transfer device.

It is difficult to arrange an output shaft of the transfer device and an input shaft of the front differential in line due to various device arrangements in the vehicle. Therefore, the front propeller shaft extending forward inclines with respect to the output shaft of the transfer device, and is connected to the output shaft of the transfer device via a constant-velocity joint.

With this structure, when the inclination angle of the front propeller shaft with respect to the output shaft of the transfer device (hereinafter, referred to as "the operation angle of the front propeller shaft") becomes large, an upper limit value of a rotational speed of the constant-velocity joint needs to be set low. That is, an upper limit value of a rotational speed of the output shaft of the transfer device and an upper limit value of a rotational speed of the front propeller shaft need to be set low.

For this reason, in many transfer devices, the constant-velocity joint is not disposed in a front part of the transfer device but is inserted into the output shaft of the transfer device so that the constant-velocity joint is located as rearward as possible. Thus, an increase of the operation angle is prevented. JP1992-228953A discloses one example of such a structure, in which a sprocket thereof corresponds to the output shaft described above.

However, in the case of inserting the constant-velocity joint into the output shaft of the transfer device, the constant-velocity joint is located between front and rear bearings supporting the output shaft, and the constant-velocity joint is surrounded by the output shaft. Thus, heat generated by the constant-velocity joint is not easily released outside, which may result in lowering the rotational speed of the constant-velocity joint.

SUMMARY OF THE DISCLOSURE

The present disclosure is made in view of the above situations and aims to provide a transfer device, in which a constant-velocity joint is disposed as distant as possible from part-time drive wheels and heat generated by the constant-velocity joint is easily released outside.

According to one aspect of the present disclosure, a transfer device is provided, which includes an input shaft configured to receive a driving force generated by a drive source, an output shaft configured to output a portion of the driving force received by the input shaft to part-time drive wheels of a vehicle, a transfer case accommodating the input shaft and the output shaft, at least two output bearings rotatably supporting the output shaft, and a constant-velocity joint connected to the output shaft and provided on a first side of the part-time drive wheels with respect to the output shaft. The output shaft is formed with a recessed opening portion opening to the first side and receiving at least a part of the constant-velocity joint therein. The transfer case has an annular intruding part extending from a position on the first side of the output shaft into the recessed opening portion through a position between the recessed opening portion and the constant-velocity joint. A first output bearing is located inside the recessed opening portion, fixed at an outer circumferential part to an inner circumferential surface of the recessed opening portion, and fixed at an inner circumferential part to an outer circumferential surface of the intruding part, the first output bearing being one of the at least two output bearings that is located closest to the constant-velocity joint among the at least two output bearings.

According to this configuration, the constant-velocity joint is disposed inside the recessed opening portion formed in the output shaft. Thus, the constant-velocity joint is located as far as possible from the part-time drive wheels. Further, with the configuration, the intruding part of the transfer case passes between the recessed opening portion and the constant-velocity joint. Thus, the constant-velocity joint is not surrounded by the output shaft or the intruding part. Therefore, the constant-velocity joint easily comes into contact with outside air, and heat generated by the constant-velocity joint is easily released to the outside environment.

With the transfer device, an inner diameter of the intruding part may increase while extending toward the constant-velocity joint.

According to this configuration, an opening area of a first side portion of the intruding part becomes large. Therefore, the constant-velocity joint more easily comes into contact with the outside air, and the heat generated by the constant-velocity joint is more easily released outside.

The transfer device may include a seal member sealing a gap between the intruding part and the output shaft. The output shaft may have a cylindrical protruding part located inside the recessed opening portion. The seal member may be provided inside the recessed opening portion, between the intruding part and the protruding part.

According to this configuration, the seal member is located inside the recessed opening portion. Thus, upon securing the sealing performance, the constant-velocity joint is located as rearward as possible while easily coming into contact with outside air. Therefore, the heat generated by the constant-velocity joint is easily released outside.

The transfer device may include a drive part connected to the input shaft, and a driven part connected to the output shaft and configured to be driven by the drive part. The recessed opening portion may be located on an inner side of the driven part in radial directions thereof.

According to this configuration, the recessed opening portion is located radially inward of the driven part. Therefore, the radially inner portion (area) of the driven part of the output shaft is effectively utilized.

A contact line of the first output bearing may be inclined toward the constant-velocity joint with respect to a direction perpendicular to a rotation axis of the first output bearing.

Here, the "contact line" is a straight line joining a contact point between a ball and an outer ring and a contact point between the ball and an inner ring and extending toward the center of rotation. According to this configuration, in terms of dynamics, a supporting point supporting the output shaft of the first output bearing is located on a side of the constant-velocity joint with respect to the driven part or near the driven part. Here, when the supporting point of the first output bearing is located on the constant-velocity joint side with respect to the driven part, the driven part is located between the supporting point of the first output bearing and a supporting point of the output bearing other than the first output bearing. Therefore, even when the first output bearing is located radially inward of the driven part, the driven part is supported at both sides in axial directions thereof. On the other hand, even when the supporting point of the first output bearing is located on the opposite side from the constant-velocity joint with respect to the driven part, if it is located near the driven part, a load on the first output bearing in radial directions thereof resulted from supporting the driven part is reduced.

DETAILED DESCRIPTION OF THE DISCLOSURE

Hereinafter, a transfer device according to one embodiment of the present disclosure is described.

<Driving Force Transmission System>

Figure 1:
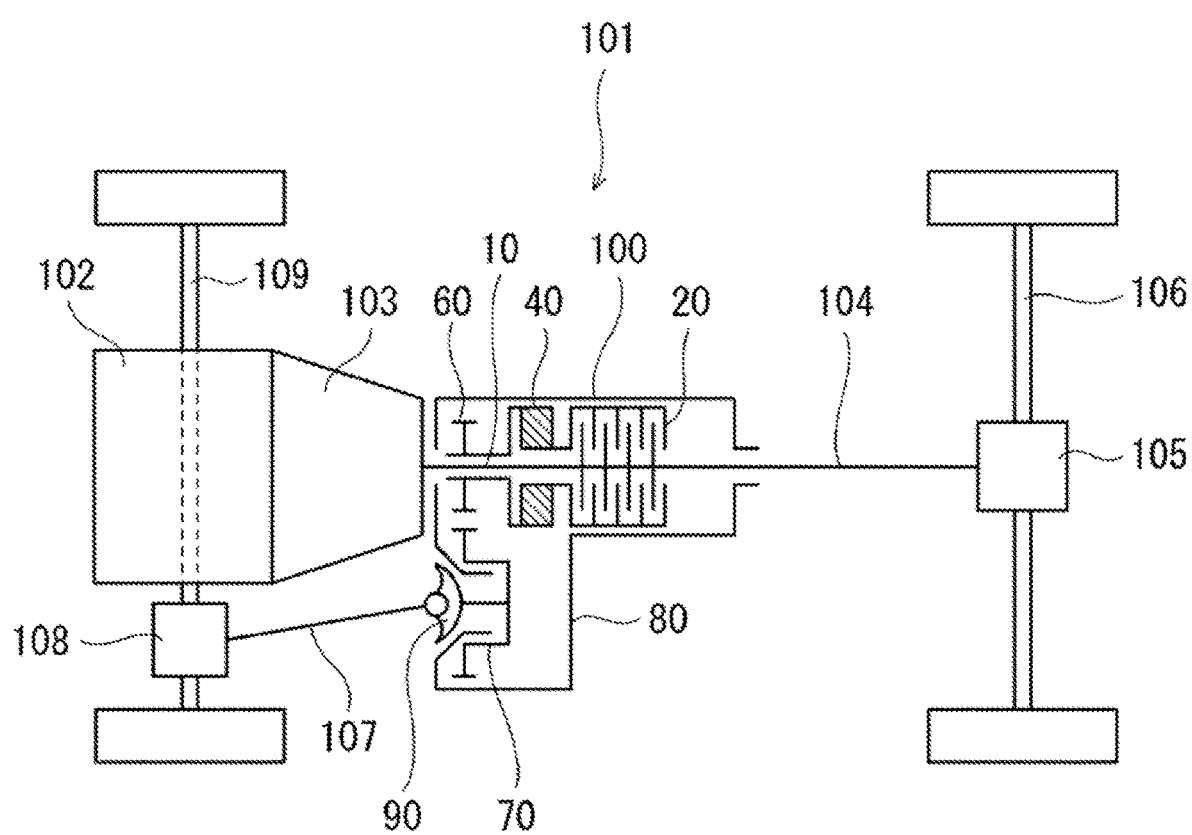
FIG. 1 is a schematic view of a driving force transmission system.

First, a driving force transmission system including the transfer device is described. FIG. 1 is a schematic view of the driving force transmission system 101 of this embodiment. Note that the concept of directions in the following description matches with the concept of directions seen from a vehicle operator on a driver's seat. In FIG. 1, the left side of the drawing is a front side, and the right side of the drawing is a rear side.

The driving force transmission system 101 of this embodiment is a system for an FR-base four-wheel drive vehicle. An engine 102 (drive source) is vertically placed in a front part of the vehicle, and a driving force generated by the engine 102 is inputted to a transfer device 100 via a transmission 103. The transfer device 100 transmits (distributes) a portion of the inputted driving force to rear wheels (drive wheels), and a remaining portion of the inputted driving force to front wheels (part-time drive wheels).

For example, the portion of the driving force inputted to the transfer device 100 is transmitted to a rear-wheel driveshaft 106 via a rear propeller shaft 104 and a rear differential gear 105. The remaining portion of the driving force inputted to the transfer device 100 is transmitted to a front-wheel driveshaft 109 via a front propeller shaft 107 and a front differential gear 108.

<Transfer Device>

Figure 2:
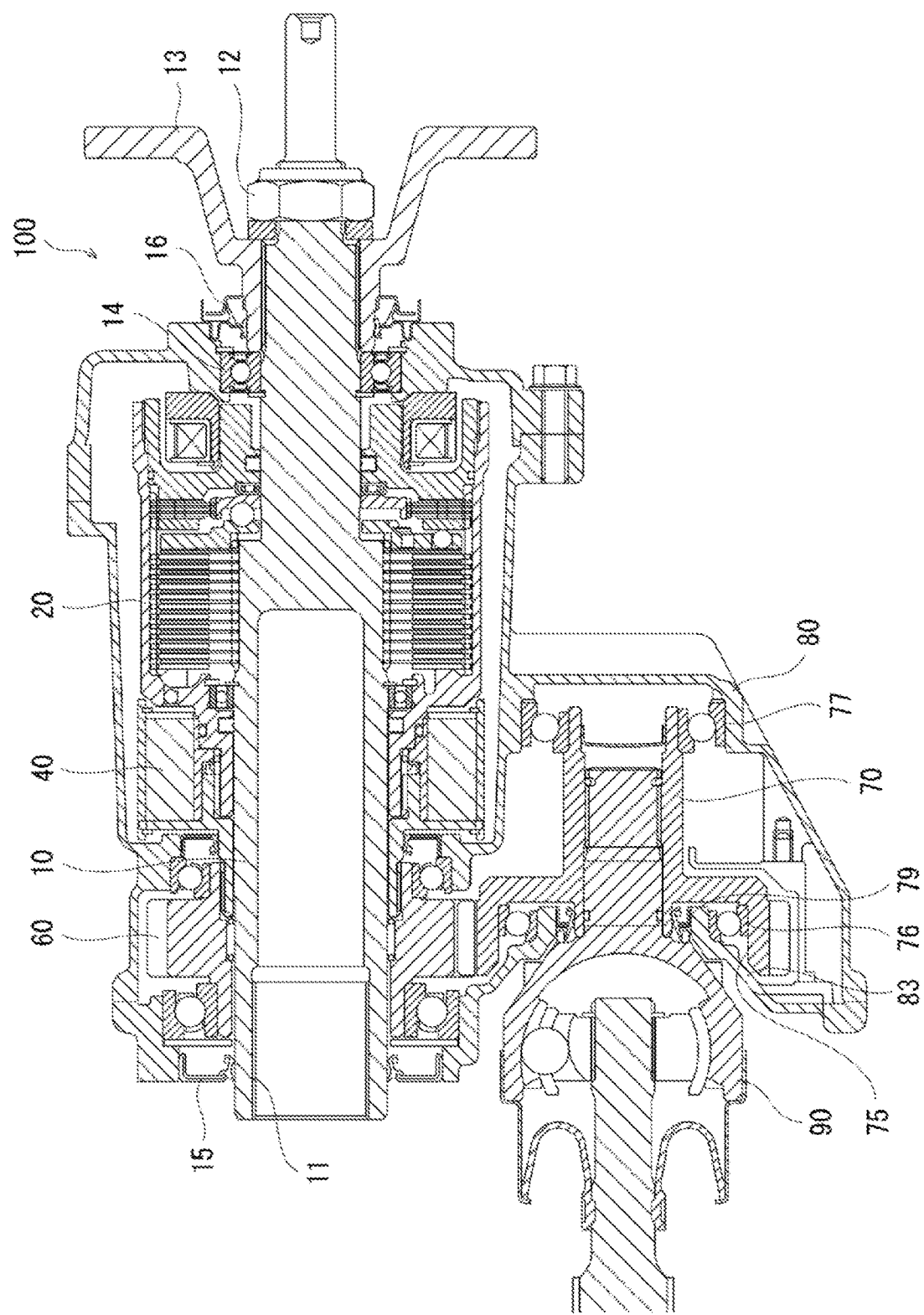
FIG. 2 is a cross-sectional view of a transfer device.
Figure 3:
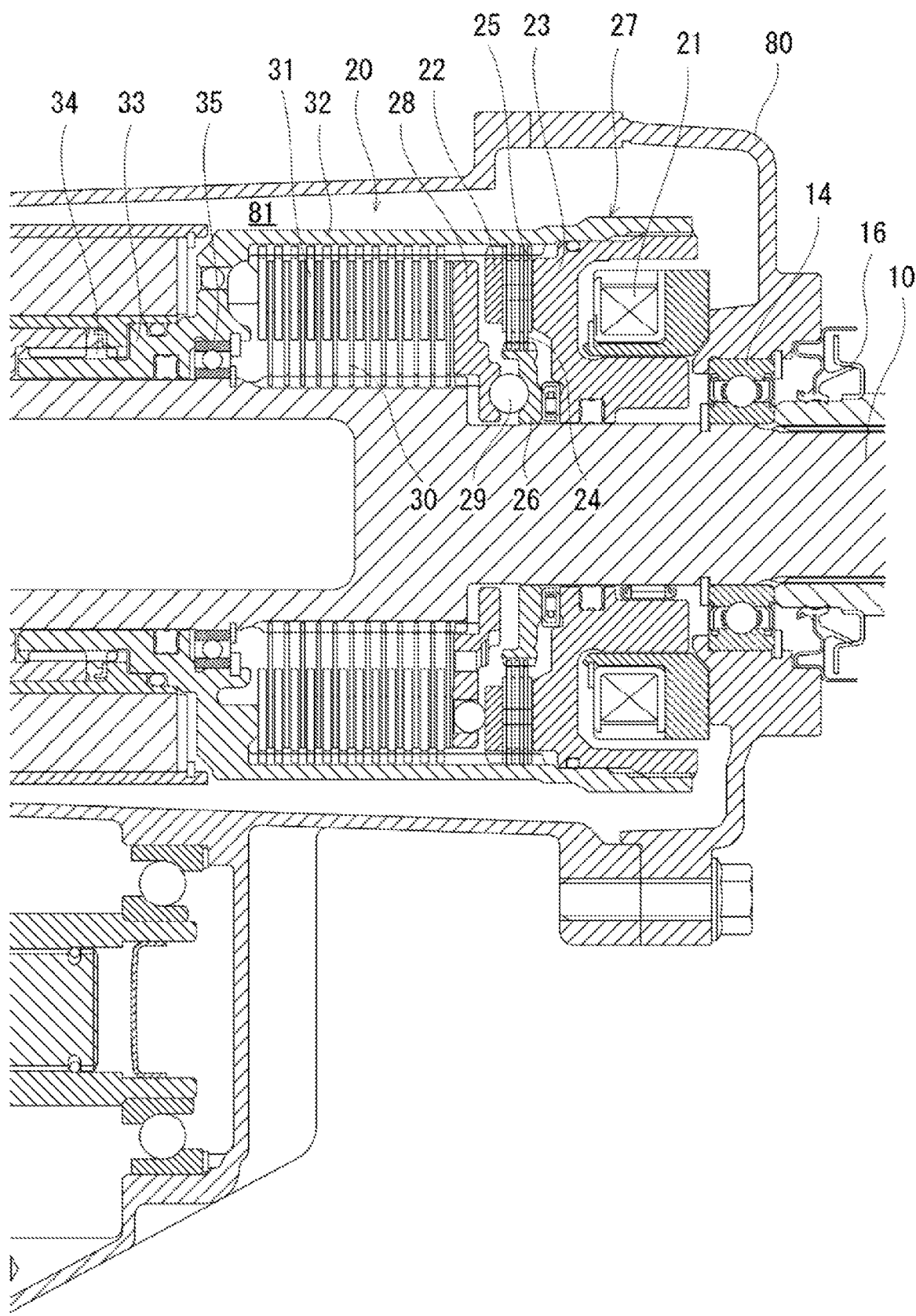
FIG. 3 is an enlarged view of FIG. 2 near a coupling device.
Figure 4:
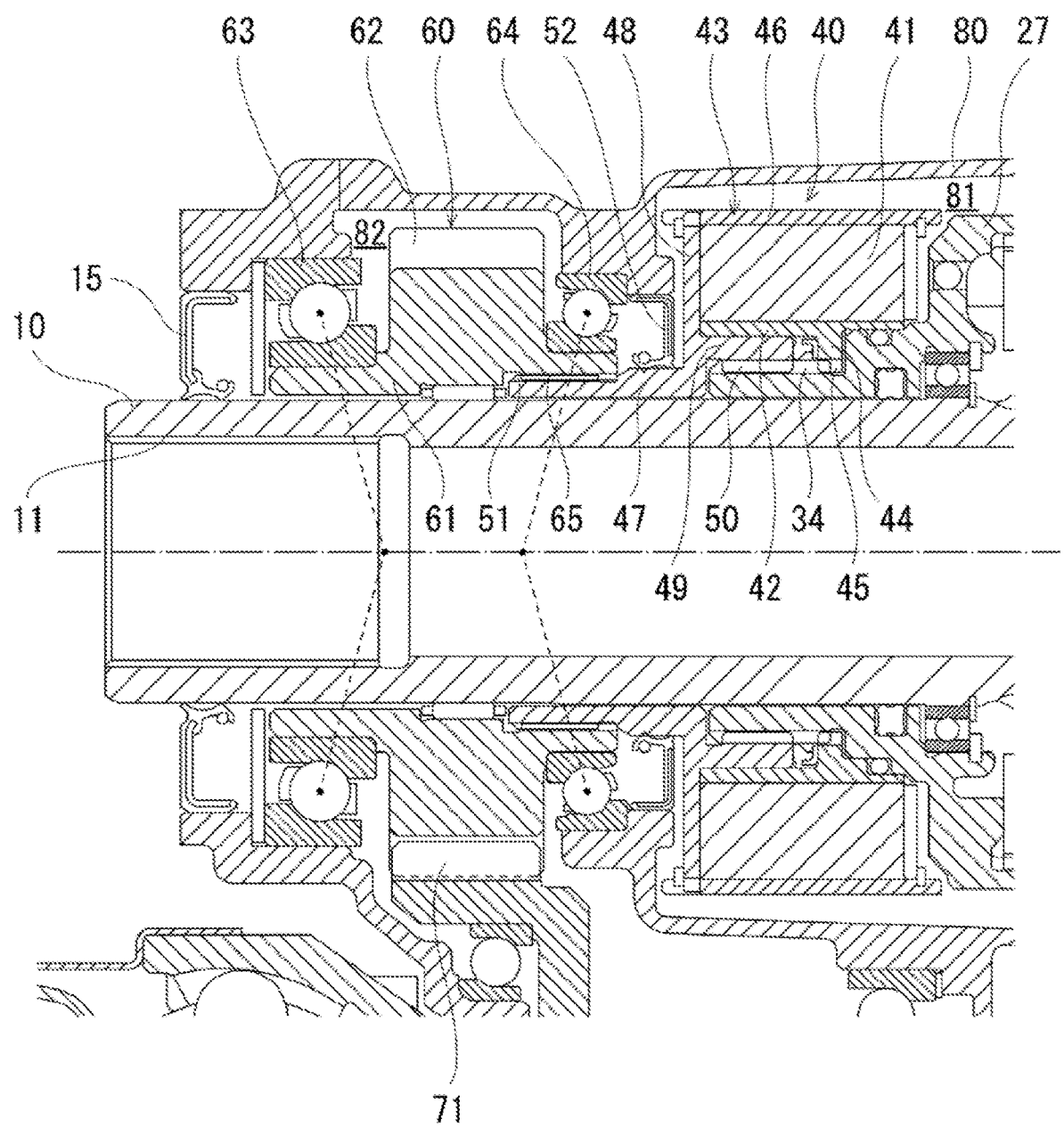
FIG. 4 is an enlarged view of FIG. 2 near a damper device and a drive member.
Figure 5:
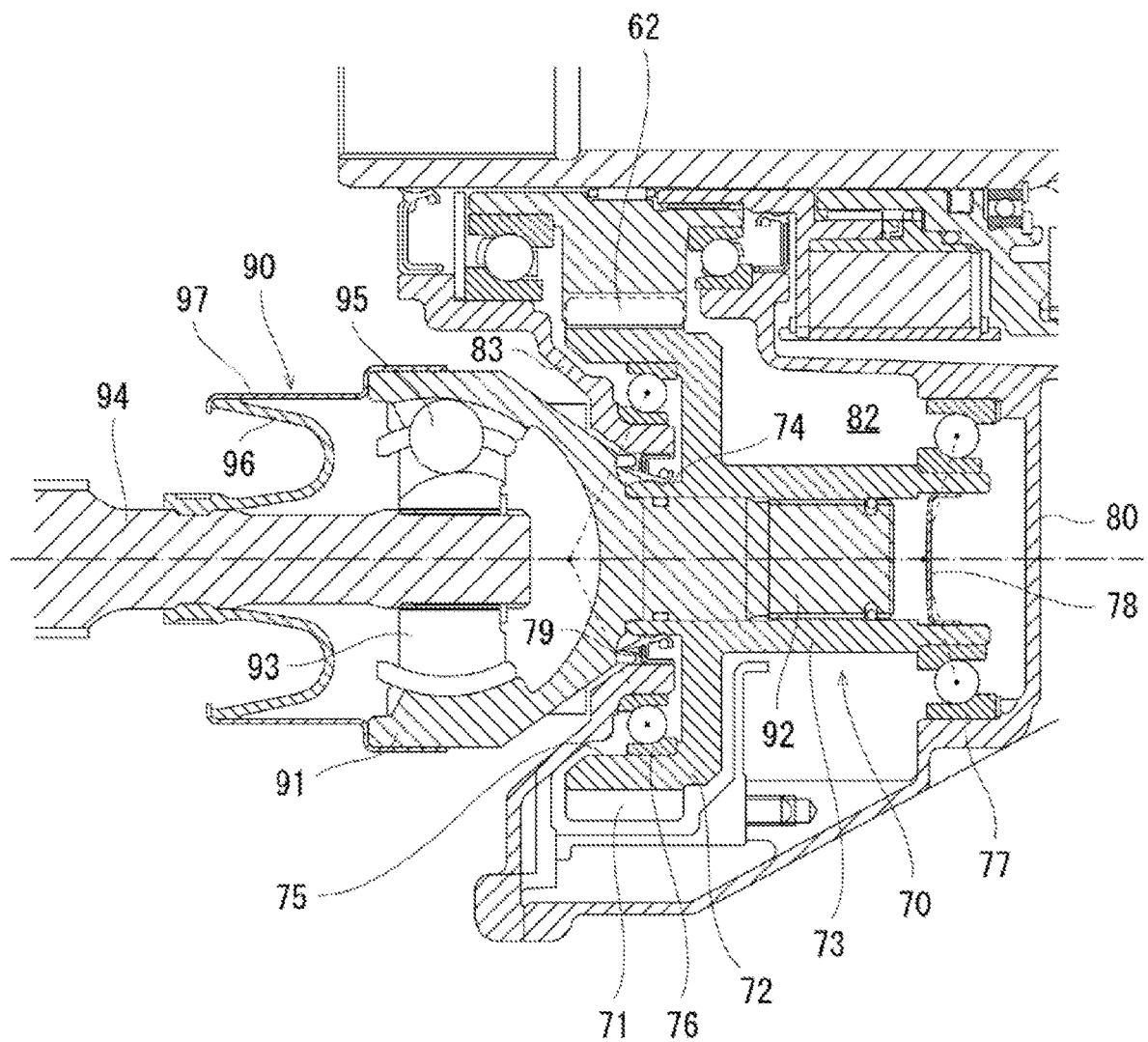
FIG. 5 is an enlarged view of FIG. 2 near an output shaft and a constant-velocity joint.

Next, the transfer device 100 is described in detail. FIG. 2 is a cross-sectional view of the transfer device 100. Further, FIGS. 3 to 5 are enlarged views of various parts of the transfer device 100 illustrated in FIG. 2. As illustrated in FIG. 2, the transfer device 100 includes an input shaft 10, a coupling device 20, a damper device 40, a drive member 60, an output shaft 70, a transfer case 80, and a constant-velocity joint 90. Hereinafter, these components are described sequentially.

<Input Shaft>

The input shaft 10 is a shaft member to which the driving force generated by the engine 102 is inputted. The input shaft 10 extends in the front-and-rear directions and is formed therein with an insertion portion 11 at a front end part, into which an output shaft of the transmission 103 (see FIG. 1) is inserted. On the other hand, a coupling member 13 is fixed to a rear end part of the input shaft 10 by a nut 12. The input shaft 10 is coupled to the rear propeller shaft 104 (see FIG. 1) via the coupling member 13.

The input shaft 10 is rotatably supported at a rear part by the transfer case 80 via an input bearing 14. Further, an input-shaft front seal 15 is provided between a front part of the input shaft 10 and the transfer case 80, and an input-shaft rear seal 16 is provided between the coupling member 13 and the transfer case 80.

<Coupling Device>

The coupling device 20 adjusts a ratio of the driving force transmitted to the rear wheels and the driving force transmitted to the front wheels. As illustrated in FIG. 3, the coupling device 20 is provided therein with an electromagnet 21. When an electromagnetic coil of the electromagnet 21 is energized, the electromagnet 21 attracts an armature 22 located forward of the electromagnet 21. When the armature 22 is attracted, pilot inner plates 24 and pilot outer plates 25 that are arranged alternately are sandwiched between the armature 22 and an end member 23, and the plates 24 and 25 are frictionally engaged. The pilot inner plates 24 are held by a cam member 26 and the pilot outer plates 25 are held by a housing 27. Thus, the cam member 26 is coupled to the housing 27.

With this structure, a pressure plate 28 which rotates together with the input shaft 10 rotates with respect to the cam member 26, and a positional relationship between a spherical cam follower 29 and the cam member 26 in a circumferential direction is changed. Therefore, the cam follower 29 moves forward and pushes the pressure plate 28 forward. When the pressure plate 28 is pushed forward, main inner plates 30 and main outer plates 31 that are arranged alternately are frictionally engaged, and the input shaft 10 holding the main inner plates 30 and the housing 27 holding the main outer plate 31 are coupled to each other. Thus, the driving force inputted to the input shaft 10 is transmitted to the housing 27.

Note that by varying the magnitude of a current for energizing the electromagnetic coil of the electromagnet 21, the force forwardly pushing the pressure plate 28 changes and the friction force acting between the main inner plates 30 and the main outer plates 31 changes. In this manner, the magnitude of the driving force transmitted from the input shaft 10 to the housing 27 may arbitrarily be set, which leads to an adjustable ratio between the driving force transmitted to the rear wheels and the driving force transmitted to the front wheels.

The housing 27 of the coupling device 20 has a housing large-diameter part 32 which has a cylindrical shape and holds therein the pilot outer plates 25 and the main outer plates 31 to be movable in the front-and-rear directions, and a housing small-diameter part 33 located forward of the housing large-diameter part 32. Here, an outer circumferential part of the housing small-diameter part 33 is formed with a housing spline 34. Note that a housing bearing 35 is provided between the housing 27 and the input shaft 10 so that the housing 27 and the input shaft 10 are coupled to be rotatable in relation to each other.

<Damper Device>

The damper device 40 shifts a resonance frequency which occurs in the engine 102 (see FIG. 1) to the outside of a regular-use range. As illustrated in FIG. 4, the damper device 40 of this embodiment has a ring-shaped elastic member 41 made of rubber, an inner circumferential member 42 fixed to an inner circumferential surface of the elastic member 41, and an outer circumferential member 43 fixed to an outer circumferential surface of the elastic member 41.

The inner circumferential member 42 has a first coupling part 44 in a radially-inward part and is formed with a first damper spline 45 in an inner circumferential portion of the first coupling part 44. The first damper spline 45 is coupled to the housing spline 34.

The outer circumferential member 43 has an outer circumferential large-diameter part 46 having a cylindrical shape and fixed to the outer circumferential surface of the elastic member 41, an outer circumferential small-diameter part 47 located in a front part, an outer-circumferential intermediate part 48 coupling the outer circumferential large-diameter part 46 to the outer circumferential small-diameter part 47, and a second coupling part 49 having a cylindrical shape, extending rearward from the outer-circumferential intermediate part 48, and located radially inward of the inner circumferential member 42. An inner circumferential portion of the second coupling part 49 is formed with a second damper spline 50. This second damper spline 50 is coupled to the housing spline 34. Further, an outer circumferential portion of the outer circumferential small-diameter part 47 is formed with a damper outer spline 51, and an inner seal 52 is provided between the outer circumferential small-diameter part 47 and the transfer case 80.

As described above, both the first damper spline 45 and the second damper spline 50 are coupled to the housing spline 34. Note that a clearance between the teeth of the second damper spline 50 and the teeth of the housing spline 34 is larger than a clearance between the teeth of the first damper spline 45 and the teeth of the housing spline 34. Therefore, when the driving force transmitted from the coupling device 20 to the damper device 40 is small, the housing spline 34 contacts the first damper spline 45 and the driving force is mainly transmitted from the housing 27 to the outer circumferential member 43 via the inner circumferential member 42 and the elastic member 41. On the other hand, when the driving force transmitted from the coupling device 20 to the damper device 40 is large, the elastic member 41 is twisted and the housing spline 34 contacts the second damper spline 50, and thus, the driving force is mainly transmitted from the housing 27 directly to the outer circumferential member 43 (second coupling part 49).

Note that although the damper device 40 of this embodiment has the elastic member 41, it may adopt a dynamic damper or a centrifugal pendulum damper instead of the elastic member 41. Further, although the elastic member 41 of this embodiment is made of rubber, it may be a spring.

<Drive Member>

The drive member 60 has a cylindrical base part 61 located in its inner circumferential part, and a drive part 62 located in its outer circumferential part and integrally formed with the base part 61. A first drive bearing 63 is provided between a front portion of the base part 61 and the transfer case 80, and a second drive bearing 64 is provided between a rear portion of the base part 61 and the transfer case 80. In other words, the drive member 60 is rotatably supported by the transfer case 80 via the first and second drive bearings 63 and 64.

Moreover, a rear inner-circumferential portion of the base part 61 is formed with a drive inner spline 65 to be coupled to the damper outer spline 51. Therefore, the drive member 60 rotates as the outer circumferential member 43 of the damper device 40 rotates, and the driving force is transmitted from the damper device 40 to the drive member 60.

Note that the first and second drive bearings 63 and 64 are rolling bearings capable of bearing both a radial load (load applied in the radial directions) and a thrust load (load applied in the axial directions). Here, regarding the first drive bearing 63, a straight line joining a contact point between a ball and an outer ring and a contact point between the ball and an inner ring, and extending toward the center of rotation (hereinafter, referred to as "contact line"; indicated by the dashed line in FIG. 4), is inclined rearward with respect to the radial directions (directions perpendicular to the rotation axis). On the other hand, a contact line of the second drive bearing 64 is inclined forward with respect to the radial directions. Note that in terms of dynamics, it can be considered that a bearing supports a rotary body at a point where the rotation axis of the rotary body and the contact line intersect (hereinafter referred to as "supporting point").

Further, the drive part 62 drives a driven part 71 (described later) and transmits the driving force to the driven part 71. The drive part 62 of this embodiment is a so-called helical gear. Therefore, when transmitting the driving force to the driven part 71, the drive part 62 receives from the driven part 71 a reaction force including, not only a component in directions perpendicular to the axial directions, but also a component in the axial directions. Note that as described above, in this embodiment, by disposing the first drive bearing 63 and the second drive bearing 64 such that the contact lines thereof approach each other, the bearings 63 and 64 stably support the drive part 62.

<Output Shaft>

The output shaft 70 is a shaft member disposed parallel to the input shaft 10 and outputs a portion of the driving force inputted to the input shaft 10, to the front wheels via the constant-velocity joint 90. As illustrated in FIG. 5, the output shaft 70 has the driven part 71, an output-shaft large-diameter part 72, an output-shaft small-diameter part 73, and a protruding part 74.

The driven part 71 is coupled to the drive part 62 and driven by the drive part 62. The driven part 71 of this embodiment is a so-called helical gear. Therefore, the driven part 71 receives from the drive part 62 a reaction force including a component in the axial directions and a component in directions perpendicular to the axial directions.

The output-shaft large-diameter part 72 is located in a front part of the output shaft 70 and the driven part 71 is located radially outward of the front part. Further, the output-shaft large-diameter part 72 is formed with a recessed opening portion 75 opening forward. That is, the recessed opening portion 75 is located radially inward of the driven part 71. Moreover, a first output bearing 76 is provided inward of the recessed opening portion 75 to rotatably support the output shaft 70. This first output bearing 76 is a rolling bearing capable of bearing both a radial load and a thrust load. The first output bearing 76 is located inside the recessed opening portion 75. An outer circumferential part (outer ring) of the first output bearing 76 is fixed to an inner circumferential surface of the recessed opening portion 75, and an inner circumferential part (inner ring) of the first output bearing 76 is fixed to an outer circumferential surface of the transfer case 80 (an intruding part 83). A contact line of the first output bearing 76 is inclined to forward with respect to radial directions.

The output-shaft small-diameter part 73 is a cylindrical part located rearward of the output shaft 70. A second output bearing 77 is provided between an outer circumferential surface of the output-shaft small-diameter part 73 and the transfer case 80. This second output bearing 77 is a rolling bearing capable of bearing both a radial load and a thrust load. A contact line of the second output bearing 77 is inclined to forward with respect to the radial directions. Further, a cap member 78 is attached to an inner side of a rear portion of the output-shaft small-diameter part 73.

The protruding part 74 is a cylindrical part protruding forward from a position inside the recessed opening portion 75 and radially inward of the first output bearing 76. An output shaft seal 79 is provided between the protruding part 74 and the transfer case 80 to seal a gap between the transfer case 80 (intruding part 83) and the output shaft 70 (protruding part 74). As illustrated in FIG. 5, in this embodiment, the drive part 62, the driven part 71, the first output bearing 76, and the output shaft seal 79 are located at the same position in the axial directions (front-and-rear-directions) and arranged in a substantially straight line in a cross-sectional view.

<Transfer Case>

The transfer case 80 forms a contour of the transfer device 100 and accommodates the input shaft 10, the output shaft 70, etc. As illustrated in FIG. 4, space inside the transfer case 80 is divided, for example at the inner seal 52 as a boundary, into a first accommodation space 81 accommodating the coupling device 20, the damper device 40, etc., and a second accommodation space 82 accommodating the drive member 60, the output shaft 70, etc. Oil is injected into the second accommodation space 82.

As illustrated in FIG. 5, the transfer case 80 has the intruding part 83 having an annular shape and intruding into the recessed opening portion 75. The intruding part 83 also has a conical shape so that an inner diameter thereof decreases as it extends rearwardly, and increases as it extends forwardly. The intruding part 83 extends from a position forward of the output shaft 70 into the recessed opening portion 75 through a gap between the recessed opening portion 75 and the constant-velocity joint 90, and a rear end portion of the intruding part 83 is located inside the recessed opening portion 75.

<Constant-Velocity Joint>

The constant-velocity joint 90 connects the output shaft 70 with the front propeller shaft 107 (see FIG. 1) and rotates the front propeller shaft 107, which is inclined with respect to the output shaft 70, at the same speed as the output shaft 70. The constant-velocity joint 90 of this embodiment is a so-called Rzeppa constant-velocity joint, and includes an outer joint member 91, an inner joint member 93, and a plurality of torque transmission balls 95 located between the outer joint member 91 and the inner joint member 93. Further, a joint input shaft 92 is fixed to the outer joint member 91, and a joint output shaft 94 is fixed to the inner joint member 93.

The joint input shaft 92 is spline-fitted to the inner side of the output-shaft small-diameter part 73. When the joint input shaft 92 and the outer joint member 91 are rotationally driven by the output shaft 70, the driving force is also transmitted to the inner joint member 93 and the joint output shaft 94 via the torque transmission balls 95 and the inner joint member 93 and the joint output shaft 94 also rotate. Here, the joint output shaft 94 rotates in a state where it is inclined with respect to the joint input shaft 92. Note that a tip end part of the joint output shaft 94 is connected to the front propeller shaft 107.

The outer joint member 91 of the constant-velocity joint 90 is located radially inward of the intruding part 83, and a part of the outer joint member 91 is located inside the recessed opening portion 75. A rear part of the outer joint member 91 has a shape corresponding to the inner circumferential surface of the intruding part 83, and a labyrinth gap is formed between the outer joint member 91 and the intruding part 83. By forming this labyrinth gap, entrance of foreign matters into the transfer case 80 through the space between the outer joint member 91 and the intruding part 83 is prevented.

A lubricant such as grease is sealed inside the constant-velocity joint 90. Further, a boot 96 and a boot connecting member 97 are provided between the outer joint member 91 and the joint output shaft 94 to prevent the lubricant from leaking outside. The boot 96 is fixed to an outer circumferential surface of the joint output shaft 94 at one end and fixed to a front end part of the boot connecting member 97 at the other end. Further, the front end part of the boot connecting member 97 is fixed to the boot 96, and a rear end part thereof is fixed to the outer joint member 91.

<Operations and Effects>

In the above embodiment, the constant-velocity joint 90 is disposed inside the recessed opening portion 75 formed in the output shaft 70, so that the constant-velocity joint 90 is located as rear as possible. Therefore, a distance between the output shaft 70 and the front differential gear 108 increases, an inclination angle (operation angle) of the front propeller shaft 107 with respect to the output shaft 70 decreases. As a result, an upper limit value of the rotational speed of the constant-velocity joint 90 may be set to be high.

Further, in this embodiment, the intruding part 83 of the transfer case 80 passes between the recessed opening portion 75 and the constant-velocity joint 90, and the first output bearing 76 and the output shaft seal 79 are located inside the recessed opening portion 75. Thus, the constant-velocity joint 90 is not surrounded (covered) by the output shaft 70 or the intruding part 83. As a result, the constant-velocity joint easily comes into contact with outside air, and heat generated by the constant-velocity joint is easily released to the outside.

Further, in this embodiment, the intruding part 83 is formed so that its inner diameter increases as it extends forwardly. Thus, the opening area of the front portion of the intruding part 83 becomes large. Therefore, the constant-velocity joint 90 more easily comes into contact with the outside air, and the heat generated by the constant-velocity joint 90 is more easily released to the outside.

Further, in terms of the structure, the part corresponding to the driven part 71 of the output shaft 70 (output-shaft large-diameter part 72) tends to have a large outer diameter. Therefore, in this embodiment, by disposing the recessed opening portion 75 radially inward of the driven part 71, the radially inner portion of the driven part 71 of the output shaft 70 is effectively utilized.

Further, in this embodiment, out of the bearings 76 and 77 supporting the driven part 71, the first output bearing 76 which is located relatively forward has the contact line inclined forward with respect to the direction perpendicular to the rotation axis. Thus, a supporting point of the first output bearing 76 is located forward of the driven part 71. This structure allows the driven part 71 to be located between the supporting point of the first output bearing 76 and a supporting point of the second output bearing 77 in the axial directions. Therefore, in spite that the first output bearing 76 is located radially inward of the driven part 71 (at the same position in the axial directions as the driven part 71), the driven part 71 which receives the force in the radial directions (directions perpendicular to the axis) from the drive part 62 is supported at both sides in the axial directions.

Note that even if the supporting point of the first output bearing 76 cannot be located forward of the driven part 71, the supporting point of the first output bearing 76 may still be located near the driven part 71. Although in this case the driven part 71 is supported in a cantilevered state, since the supporting point of the first output bearing 76 is located near the driven part 71, the load on the first output bearing 76 in the radial directions is reduced.

<Modifications>

In the above embodiment, the drive part 62 connected to the input shaft 10 and the driven part 71 connected to the output shaft 70 are both helical gears and mesh with each other. Thus, the drive part 62 drives the driven part 71. Note that the drive part 62 and the driven part 71 are not limited to such a structure. For example, the drive part 62 may be a drive sprocket and the driven part 71 may be a driven sprocket, which may be coupled by a chain. Also in this case, the drive part 62 still drives the driven part 71.

Although the above embodiment is directed to a four-wheel drive vehicle of a front-engine, rear-wheel drive base, the present disclosure is obviously applicable to a four-wheel drive vehicle of a rear-engine, front-wheel drive base. It is needless to say that the present disclosure may adopt a motor as the drive source instead of the engine (for application to an electric automobile) and also be applicable to a hybrid vehicle using an engine and a motor in combination.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

10 Input Shaft
62 Drive Part
70 Output Shaft
71 Driven Part
74 Protruding Part
75 Recessed Opening Portion
76 First Output Bearing
77 Second Output Bearing
79 Output Shaft Seal (Seal Member)
80 Transfer Case
83 Intruding Part
90 Constant-Velocity Joint
100 Transfer Device
102 Engine (Drive Source)

What is claimed is:

1. A transfer device, comprising:
   an input shaft configured to receive a driving force generated by a drive source;
   an output shaft configured to output a portion of the driving force received by the input shaft to part-time drive wheels of a vehicle;
   a transfer case accommodating the input shaft and the output shaft;
   at least two output bearings rotatably supporting the output shaft; and
   a constant-velocity joint connected to the output shaft and provided on a first side of the part-time drive wheels with respect to the output shaft,
   wherein an outer portion of the output shaft comprises a recessed cavity forming an opening facing the first side and the constant-velocity joint, the recessed cavity containing at least a part of the constant-velocity joint within the recessed cavity,
   wherein the transfer case has an annular intruding part extending from a position on the first side of the output shaft into the recessed cavity through a position between the recessed cavity and the constant-velocity joint, and
   wherein a first output bearing is located inside the recessed cavity, and disposed between an inner circumferential surface of the recessed cavity, and an outer circumferential surface of the annular intruding part of the transfer case, the first output bearing being one of the at least two output bearings that is located closest to the constant-velocity joint among the at least two output bearings.

2. The transfer device of claim 1, wherein an inner diameter of the annular intruding part increases while extending toward the constant-velocity joint.

3. The transfer device of claim 1, further comprising a seal member sealing a gap between the annular intruding part and the output shaft,
   wherein the output shaft has a cylindrical protruding part located inside the recessed cavity, and
   wherein the seal member is provided inside the recessed cavity, between the annular intruding part and the cylindrical protruding part.

4. The transfer device of claim 1, further comprising:
   a drive part connected to the input shaft; and
   a driven part connected to the output shaft and configured to be driven by the drive part,
   wherein the recessed cavity is located on an inner side of the driven part in radial directions thereof.

5. The transfer device of claim 4, wherein a contact line of the first output bearing is inclined toward the constant-velocity joint with respect to a direction perpendicular to a rotation axis of the first output bearing.

* * * * *